United States Patent
Brenman

[15] 3,651,577
[45] Mar. 28, 1972

[54] METHOD AND MEANS FOR VISUAL PRESENTATION OF OCCLUSAL SOUNDS AND FOR ANALYSIS AND COMPARISON THEREOF

[72] Inventor: Henry Stephen Brenman, Suite 2850 Medical Towers 255 South 17th St., Philadelphia, Pa. 19103

[22] Filed: Oct. 10, 1969

[21] Appl. No.: 865,304

[52] U.S. Cl. ...................................................32/19
[51] Int. Cl. ............................................A61c 9/00
[58] Field of Search.............128/2, 2.05 S, 2.1 A; 32/19

[56] References Cited

UNITED STATES PATENTS

| 3,140,710 | 7/1964 | Glassner et al. | 128/2.05 S |
| 3,385,289 | 5/1968 | Lawson et al. | 128/2.05 S |

Primary Examiner—Robert Peshock
Attorney—Christen & Sabol

[57] ABSTRACT

Occlusal sounds recorded by a microphone attached to a patient's head are recorded as electrical signals in real time and converted to a visual wave pattern on tape with an expanded time base to permit analysis; individual records can also be collected by a central computer from different locations and converted to a digital basis for comparison of a multitude of separate recordings.

17 Claims, 4 Drawing Figures

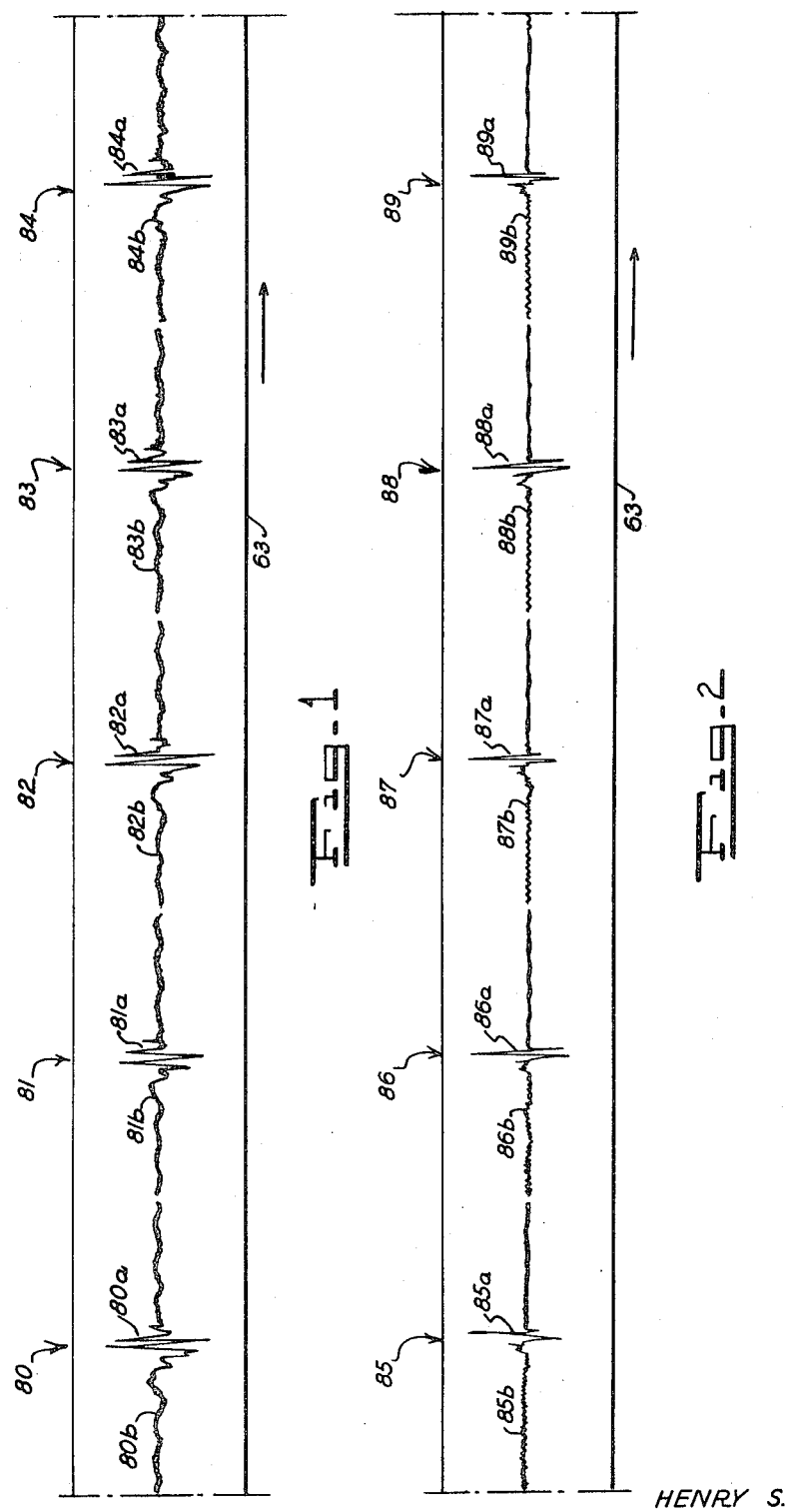

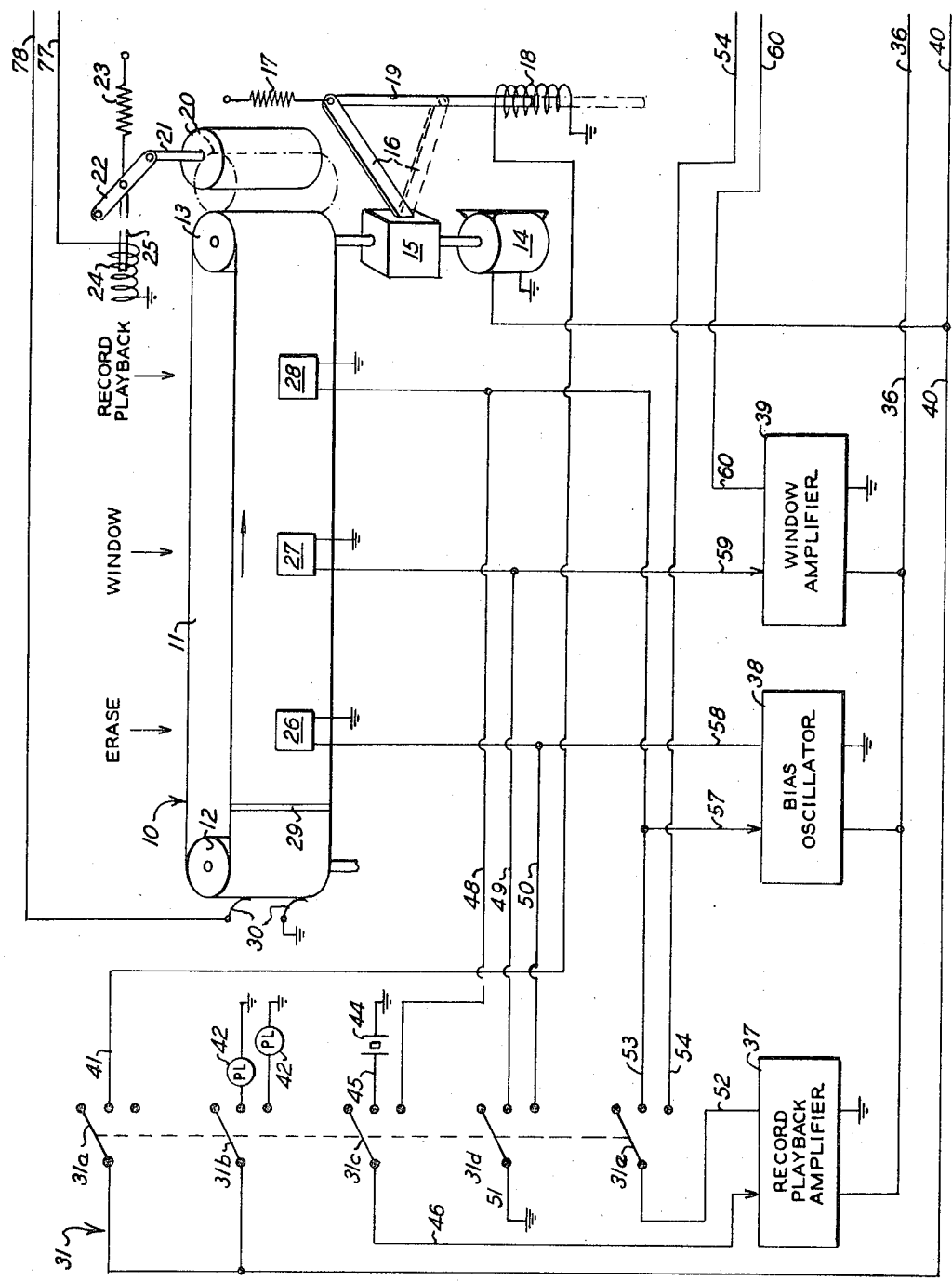

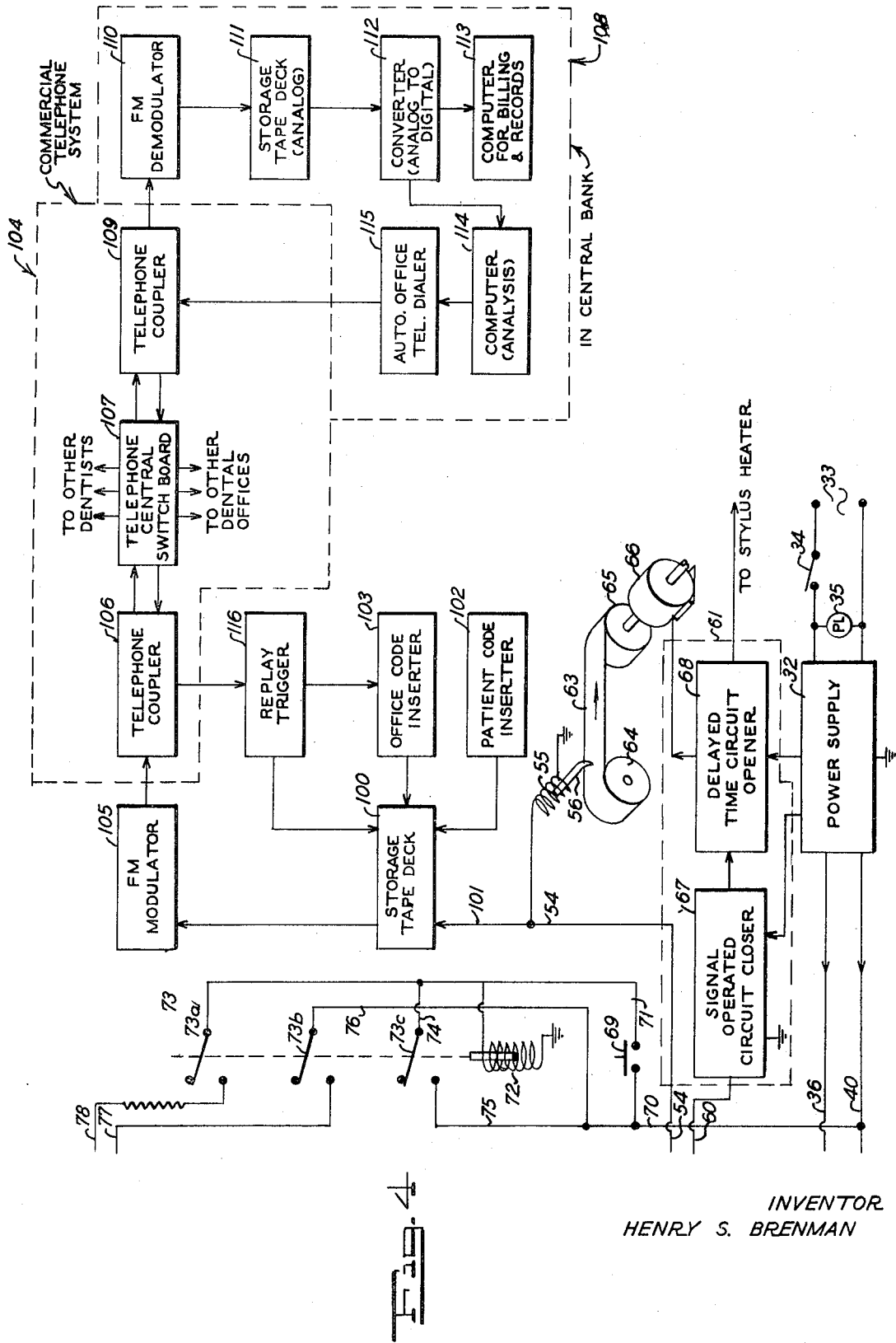

METHOD AND MEANS FOR VISUAL PRESENTATION OF OCCLUSAL SOUNDS AND FOR ANALYSIS AND COMPARISON THEREOF

This invention relates to the field of dentistry and more particularly to the study of the functioning of the oral cavity with respect to analyzing the occlusal patterns of a patient for the purpose of diagnosis and improvement thereof.

In the course of experiments it has been learned that electronic equipment may be development and adapted to pick up the most delicate sounds and manibular movements and to chart them for comparative analysis.

In the Bulletin of the Philadelphia County Dental Association Nov. 1958, a monograph by Henry S. Brenman and James S. Millsap, entitled "A 'Sound' Approach to Occlusion", disclosed that a microphone may be placed on the forehead of a patient and, by means of suitable amplification, even the slightest and most fleeting tooth-to-tooth sounds could be heard. However, in order to obtain a graphic record, the signal was fed to an oscilloscope to be displayed as a characteristic visual wave pattern. This wave pattern could be photographed by any one of several means and analyzed or stored for comparison with other sound patterns at a later date. It was also discovered that the signal from the microphone could be recorded, such as by means of a magnetic tape recorder, and transferred at will from that recording to a visual form.

The experimentation described in the above mentioned monograph revealed that the visual wave patterns, or "occlusograms", just described possessed an obvious difference between those of individuals having a "solid" clinical centric occlusion and those individuals having a so-called "slip", or eccentricity. Later confirmation of this, and other, conclusions resulting from this experimentation is described in a monograph entitles "Sound as a Diagnostic Aid in the Detection of Occlusal Discrepancies", by Henry S. Brenman, Richard C. Weiss and Maxine Black, published in the Penn-Dental Journal, Feb. 1966.

Accordingly, it is an object of the present invention to provide improvements in methods and apparatus relating to the producing of so-called "occlusograms" and for the analysis thereof.

One of the features of the invention is the provision of means whereby sound wave patterns may be recorded by a medium such as a magnetic tape moving at a speed such that a detailed analysis of such pattern would be difficult and transposing said pattern to another medium, such as a moving tape upon which the wave pattern is displayed in visual form and also expanded in a dimensional sense so as to enable a comparison and analysis of the pattern to be more easily accomplished.

Another feature of the invention is to provide a system whereby individual records obtained by dentists in their offices may be collected and transferred to a central location for further analysis and study for comparison of all of the records obtained at the individual locations. In addition, it is contemplated that the central recording and analysis system may also provide means for allocating costs and fees to be distributed to and collected from the participants in the system.

In the drawings

FIG. 1 is a plan view of a visible record of the sounds of poor occlusion as produced on a section of paper tape in accordance with this invention;

FIG. 2 is like FIG. 1 but represents the wave pattern produced by good occlusion;

FIG. 3 is a schematic diagram of a portion of a preferred circuit for producing the visible recordings shown in FIGS. 1 and 2;

FIG. 4 is a schematic diagram of the remainder of the circuit of FIG. 3 and also includes a block diagram of a preferred arrangement of components for analyzing records obtained from a plurality of sources.

In the schematic diagram shown in FIG. 3 the numeral 10 indicated generally a continuous loop magnetic tape recording and playback mechanism, having a loop of mylar, or similar tape 11 having a magnetic coating, according to well known practice, the tape being supported at one end of the loop on an idler roller 12 and at the other end by a drive capstan 13, drive by an electric motor 14 through a two-speed drive mechanism 15 having a control element 16 which is normally biassed by means, such as a spring 17, to maintain the drive mechanism in the low speed position but is movable in response to energization of the solenoid means, having a coil 18 and armature 19, to place the drive mechanism in its high-speed position.

Adjacent the capstan is a pinch roller 20 mounted on a shaft 21 which is swingably supported on arm 22 for movement toward and away from the capstan, the tape being driven only when the pinch roller is swung towards the capstan so that the tape will be gripped therebetween. Normally, the roller is urged, as by means of a spring 23 away from the capstan, in which position the capstan merely turns in loose nondriving relationship to the tape. Solenoid means, including a coil 24 and armature 25, is arranged to pull the arm 22 against the force of spring 23 for establishing the tape drive.

Positioned at spaced intervals along the length of the tape are three magnetic transducer means, of conventional construction, in operative engagement with the tape and, assuming that the direction of movement of the tape is as indicated by the arrows in FIG. 3 the transducers are arranged so that an erasing transducer head 26 is the first in sequence of operation, followed by a window transducer head 27 and a recording and playback transducer head 28. In addition, the tape is provided with an automatic stopping mechanism which limits normal travel of the tape to one complete cycle of the loop, as will be explained later. This stopping means may include a narrow transverse metallic coating 29 capable of closing a circuit when frictionally engaged by a pair of transversely spaced flexible brush contacts 30.

For controlling the various modes of operation of the tape mechanism there is provided a manually operable five-pole, three position gang switch, indicated generally by numeral 31, having movable blades 31a, 31b, 31c, 31d, and 31e.

For convenience, a common power supply 32 has been shown, but it will be understood that various elements of the assembly could be provided from separate sources. Supply 32 may be connected to the usual commercial AC power line 33, under control of a master switch 34, and a pilot light 35 may be included to indicate when the switch is closed. The lead 36 from the output of supply 36 may comprise rectified and filtered DC current for supplying various devices, such as the several low-frequency amplifiers and oscillator of conventional construction, such as the recording and playback amplifier 37, the bias oscillator 38, and window amplifier 39. Another lead 40 from the output of supply 32 may be used to conduct either filtered or unfiltered AC or DC to blades 31a and 31b of the gang switch 31 for actuating respectively the solenoid coil 18, through lead 41, and the pilot lights 42 and 43.

A contact microphone 44, with low ambient noise sensitivity for picking up the sounds of the oral cavity is grounded at one side and connected by wire 45 with the middle contact for blade 31c which, in turn, is connected by wire 46 to the input of the amplifier 37. Similarly, the recording and playback head 28 is connected by wire 48 to the third contact of blade 31c for selective connection with the input of amplifier 37. The window head 27 and erasing head 26 are connected by wires 49 and 50 to the respective middle and third contacts of blade 31d for selective grounding through lead 51 connected with the blade. The output of amplifier 37 is connected to blade 31e by wire 52, to permit the output to connected selectively to the recording and playback head 28 through the middle contact and wire and, through the third contact and wire 54 to the energizing coil 55 of a hot-wire stylus 56 (FIG. 4).

The bias oscillator 38 which is used to erase magnetic signals on tape 11 by techniques well known in the art, has its input connected by wire 57 and wire 53 to the recording and playback head 28 at all times and to the output of the record and playback amplifier 37 when blade 31e is in the recording mode, connected to the middle contact; the output of the oscillator being connected to the erasing head 26 by wire 58. The input of the window amplifier 39 is connected by wire 59 to the window head 27, while its output is transmitted by lead 60 to a control means, indicated generally by numeral 61 (FIG. 4).

In FIG. 4, the numeral 62 indicates generally a recorder for visually presenting a record of the vibrations obtained from the microphone 44 as recorded by the magnetic signals on tape 11. Preferably, such a visual record can be made by a paper tape recorder such as a hot-wire stylus polygraph manufactured by MFE (Mechanics for Electronics Company), Massachusetts. Instruments of this type are provided with a supply of paper 63 supported on a supply roll 64 and moved linearly by a takeup roll 65 driven by a motor 66, the paper being treated to record the transverse vibratory movements of the contacting heated stylus 56, which is responsive to signals transmitted to coil 55 through lead 54.

In this connection, it should be noted that the usual procedure for analyzing a patient's occlusion is to have the patient bring his jaws together several times in succession while the tape 11 is moving. However, the signal produced by each bite is of each transitory duration that, for proper visual analysis, this signal must be linearly expanded to be of significant value. A method for accomplishing this is to record the original signal on the magnetic tape 11 while moving at a relatively high speed, for example 375 mm. per second, but to reduce the speed at which the tape is run for transmitting the signal to the polygraph record. As a typical example, experience shows that if the speed is reduced by a factor of 10, so that the magnetic tape is run at 3.75 mm. per second, a very acceptable signal will be visually shown on the polygraph tape 63 if it is moved at about 100 mm. per second during reception of the signal from the magnetic tape.

On the other hand, because the patient will be asked to make several bites during the initial recording on magnetic tape, there is an appreciable lapse of time between the signals made at each bite as compared to the time lapse for each signal. For example, the length of the continuous loop 11 may be chosen so that it completes a cycle in 15 seconds and, during this period a patient may be asked to make five bites. Thus, the running of the magnetic tape—and also the polygraph tape—during the conversion to the visual wave pattern will require 15 seconds. Since the speed of the polygraph tape may be 100 mm. per second the length of the paper tape would extend to some 15 meters in length if allowed to run continuously.

Therefore, in order to conserve the amount of paper tape to be accumulated and stored, the motor control circuit 61 is designed to operate the motor approximately only during the time required for actual occlusion and to shut it off between the occurrence of significant signals. For this purpose, the window amplifier 39 comprises an amplitude sensing circuit designed, in accordance with well-known principals, to disregard signals received from the window head 27 below approximately 60 cycles per second so as to avoid false starts of the polygraph motor which might be caused by electronic "noise". The circuit of control means 61 may include a circuit 67 responsive to the output signal of the window amplifier to start the motor 66 by energizing suitable relay means and to energize a heating means (not shown) for the stylus 56 and to initiate operation of a time delayed circuit 68 to open the circuits to the motor and stylus heater after a predetermined interval, such as 3 seconds and return the relay means to a condition to permit starting the motor and heater when the next signal is received from the window amplifier. Such triggering and delay circuits are well known in the art. In this connection, it should be noted that the positioning of the window head 27 with respect to the recording and playback head 28 is such that the signal from amplifier 39 will cause the polygraph paper 63 to begin moving slightly before the signal from playback head arrives at stylus 56 so that the paper will then be running at proper speed. Similarly, the stylus heater is activated prior to the arrival of the signal from the playback head to ensure a proper impression on the paper tape.

In operation, once the main switch 34 has been closed to energize the various operating elements an automatic sequence of operations can be initiated for each mode by manually depressing a pushbutton switch 69, one side of which is connected by wires 70 and 40 to the power supply 32. The other side of the switch is connected by wire 71 to a solenoid coil 72 of a three-pole, two-position electromagnetically operated gang switch 73 which is normally maintained open. Energizing the coil 72 causes blades 73a, 73b, and 73c to close their respective circuits and, since blade 73c is connected by wire 74 with the wire 71, when this blade is closed the coil is closed will continue to be energized through the extension 75 of wire 70 when the push button is released.

Closure of blade 73c also includes closure of blades 73a and 73b. The latter blade is connected by wires 76 and 70 to the power supply and thus the pinch roller 20 will move into engagement with magnetic tape 11 as a result of energization of solenoid coil 24 through lead 77, which is now connected with blade 73b. This causes the tape 11 to start moving, and this will continue until the shorting strip 29 comes into contact with the brushes 30, at which time a momentary circuit will be established through lead 78, switch blade 73a, and extension 79 of wire 71 to ground out and deenergize coil 72 sufficient to cause switch 73 to open. This action, by opening the circuit through blade 73b to the pinch roller solenoid 24, causes the tape 11 to stop. The shorting strip 29 will, however, overrun the brushes 30 so that the pinch roller can be reengaged by actuating the push button 69.

Thus far, the operation of the system when the manual switch 31 is placed in the recording mode, namely the middle position of its switch blades, the tape 11 will record the signals picked up by the microphone 44 for one complete cycle of the tape loop, with the tape being moved at its fast rate because switch blade 31c has energized the coil 18 of the gear train 15. The polygraph recorder 62 does not turn on because the erase head 26 removes any signal that could be picked up by head 27 to turn on motor 66.

However, to transfer and convert the signals to the polygraph tape, switch 31 is first put in the playback, or third position. When this is done the gear train will return to its low speed position so that when push button 69 is next actuated, tape 11 will move at slow speed. Also, the input of stylus 56 will be connected to output of the amplifier 37 by blade 31e and the connecting lead 54 while the playback of head 28 will be connected to the input of this amplifier through blade 31c. In this case the bias oscillator input is disconnected by blade 31e and the window head 27 receives the signal before the playback head 28 to start motor 66 and the stylus heater, as previously described.

These signals are thus converted to visual wave patterns on tape 63 by the stylus and have the general appearance of the patterns shown on FIGS. 1 and 2. FIG. 1 illustrates the type of wave pattern resulting from poor occlusion wherein a patient has been asked to bite five times to produce five "bursts" indicated generally by numerals 80, 81, 82, 83, and 84. Under these conditions, the initial contacts 80a, 81a, 82a, 83a, and 84a, are followed by gradually decreasing peaks 80b, 81b, 82b, 83b and 84b caused by grinding of the teeth until they reach a centric position. In FIG. 2 the wave patterns produced by another series of "bursts" 85, 86, 87, 88 and 89, made after an adjustment of the teeth has been made, results in the production of sharply defined initial contact, illustrated at 85a, 86a, 87a, 88a and 89a, followed by almost no evidence of grinding or clashing of the teeth, as illustrated by the substantially flat subsequent wave patterns 85b, 86b, 87b, 88b, and 89b.

In addition to the production of visible recordings for use of individual dentists, this invention also contemplates the storage of such records in a form which will be available to the dentist for his own study and evaluation of his patient's condition, but also the collection, storage and analysis at a central office of the individual records acquired by a multitude of dentists at many locations.

For this purpose, the equipment just described could also include the addition of a storage means, such as a magnetic tape deck 100. This storage tape deck could be connected directly to the output of the recording and playback amplifier 37 so as to record the signals received from the microphone 44 at the time these signals are being impressed on magnetic tape 11 during the recording mode at high. However, for purposes of later transmission of these records, over commercially available utility transmission lines, it is preferable to store these signals as transmitted at slow speed to the polygraph and therefore the storage tape deck 100 is shown as being connected by wire 101 with the lead 54 connected to the input coil of stylus 56. In addition, so that the dentist may identify the source of each of the recorded wave patterns for future reference, a circuit such as indicated at 102 may be employed to add a code to each tape identifying the patient. Such devices could include a tone generator for impressing a sequence of frequencies on the tape in the storage tape deck in conjunction with recording each patients' "occlusogram". An additional coding device 103, such as a sequential tone generator, under the control of the dentist, or controlled by other means, could be employed to insert an identifying series of frequencies on the tape in the storage deck; this latter identification being used primarily to indicate the source of a number of patients' records.

While the storage tape deck 100 is arranged to be operated by individual dentists in connection with examination of patients, and may be operated by the dentist for future reference it is also contemplated that the records thus stored should be available at a remote central office and, for this purpose the commercial telephone facilities, indicated generally by numeral 104, or other communications media, may be employed. In order to do so, an FM modulator 105 can be connected to the outlet of the storage tape for transmitting the replayed signals from tape through a commercially supplied telephone coupler 106 over the usual telephone lines to the telephone central switch board 107. From this switchboard, as is obvious, the signals are capable of innumerable destinations such as the central record bank, indicated generally by numeral 108.

The central records bank is, of course, also connected by a commercially supplied coupler 109 to the telephone line leading to the switchboard !07 and this coupler may thus supply the signals received from the storage tape decks of various dentists with which the record bank may be connected by the switchboard to an FM demodulator 110 and thence to a master storage tape deck 111. This latter tape, as in the case of the previous recordings, will be in analog form but, for purposes of comparison and analysis of many of these records it will be preferable to convert them to digital form, as by means of a computer means indicated at 112. This latter computer may also be programmed to separate out such information as the individual dentist's identifying code, put in by the inserter 103, and even the patient's code from inserter 102, if such is desireable. This identifying material is fed to a billing computer 113, while the digital information provided from the "occlusograms" will be directed into an analysis computer 114.

The sequence of operations just described may be initiated from the central record bank 108 by means which are well known in the art. For example, the analysis computer may be programmed to actuate an automatic telephone dialing mechanism 115 to connect the computer with a specific dentist's office through the telephone switching system and, when connected, the computer may actuate the replay trigger mechanism 116 at said dentist's office causing the storage tape deck 100 to transmit signals to the central bank. The trigger mechanism can also cause the office code to be inserted into the transmitted signal so as to identify the source of the information and could also perform such other operations, under the control of the central bank computer, as erasing the received signal from the dentist's storage computer.

I claim:

1. Apparatus for producing visual wave patterns of acoustic vibrations resulting from oral occlusion comprising electroacoustical means for producing electrical signals in response to said acoustical vibrations, means for magnetically recording and reproducing said electrical signals, means including electromechanical means for producing visual wave patterns in response to electrical signals, and means for magnetically recording signals from said electroacoustical transducer at the real time rate of speed at which said acoustic vibrations are produced and for producing wave patterns corresponding to said acoustic vibrations from said magnetically recorded signals at a rate of speed slower than the rate at which said signals were recorded.

2. Apparatus defined in claim 1, wherein the ratio between the rate of speed of recording and the rate of speed of producing visual signals is on the order of ten to one.

3. Apparatus defined in claim 1, wherein said means for magnetically recording signals includes magnetic tape recorder means having means for moving said tape at two different rates of speed.

4. Apparatus defined in claim 1, wherein said means for producing visual wave patterns includes means for moving a strip of material and stylus means responsive to signals received from the magnetic tape recorder for impressing wave pattern indicia on said moving strip.

5. Apparatus defined in claim 4, wherein said means for moving said strip of material includes an electric motor and a stylus means and said means for magnetically recording electrical signals includes circuit means for initiating operation of said motor in advance of transmission of a signal to said stylus means.

6. Apparatus defined in claim 4, wherein said apparatus includes switching means for operating said apparatus in one mode for receiving and recording a signal magnetically and for operating said apparatus in another mode for transforming said magnetic signals into a visual wave pattern, said switching means including means for making said transformation at a rate of speed other than the rate of speed of recording the magnetic signals.

7. Apparatus defined in claim 6, wherein said transformation is accomplished at a rate of speed less than one-half the speed of recording.

8. Apparatus defined in claim 7, wherein said transformation is accomplished at a rate of speed approximately one-tenth the speed of recording.

9. Apparatus defined in claim 5, wherein said circuit means for initiating operation of said motor for the strip of material includes time delayed circuit opening means for stopping operation of said motor after a predetermined interval.

10. Apparatus defined in claim 9, wherein said predetermined interval is approximately the length of time for transforming to said strip of material the useful portion of a wave pattern produced by one occlusion.

11. Apparatus defined in claim 9, wherein said useful portion of said wave pattern is produced by occlusion in approximately 0.3 seconds, and said producing of wave patterns is accomplished at a slower rate of speed, said predetermined interval for opening said motor circuit is at least 1.5 seconds and less than 4.5 seconds.

12. Apparatus defined in claim 11, wherein said predetermined interval is approximately 3.0 seconds.

13. Apparatus defined in claim 1, wherein said means for magnetically recording and reproducing electrical signals includes a continuous loop of paramagnetic material, disengageable drive means for moving said loop of material at predetermined rates of speed, and control circuit means for actuating said drive means, said control circuit means including means for disengaging said drive means after one cycle of movement of said loop of material.

14. Apparatus defined in claim 13, wherein said means for actuating the drive means includes electromagnet means, and said control circuit means includes a conductive area on the surface of said loop of material for completing a portion of said control circuit means.

15. Dental diagnostic method comprising the steps of applying electroacoustic transducer means to a patient in the region of the oral cavity, recording electrical signals generated by acoustic vibrations resulting from the patient's occlusion at the real time rate of speed, employing polygraph recorder means having an electrically activated stylus means and introducing said recorded signals to the stylus means of the polygraph means at a slower rate of speed to produce a visible wave pattern having an expanded time base.

16. The method of claim 15 which includes the steps of recording signals resulting from a plurality of occlusions produced in succession, and actuating the polygraph tape recorder means only during the periods of time necessary to produce useful wave patterns.

17. The method of claim 15 which includes the steps of utilizing a magnetic tape recorder means for recording the signals from the electroacoustic transducer means, continuously operating said magnetic tape recorder means at one speed for recording said plurality of occlusions, continuously operating the magnetic tape recorder means at another speed and intermittently operating the polygraph tape recorder means while said magnetic tape recorder means is operating at said slower speed.

* * * * *